United States Patent
Joseph et al.

(10) Patent No.: US 10,083,252 B2
(45) Date of Patent: *Sep. 25, 2018

(54) RANKING AUTOCOMPLETE RESULTS BASED ON A BUSINESS COHORT

(71) Applicant: INTUIT INC., Mountain View, CA (US)

(72) Inventors: Sony Joseph, Mountain View, CA (US); Ilya A. Izrailevsky, Sunnyvale, CA (US); Sunil K. Tripathy, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/276,580

(22) Filed: May 13, 2014

(65) Prior Publication Data

US 2015/0331878 A1    Nov. 19, 2015

(51) Int. Cl.
  G06F 17/30    (2006.01)
  G06Q 10/06    (2012.01)
  G06Q 10/10    (2012.01)

(52) U.S. Cl.
  CPC ......... *G06F 17/3097* (2013.01); *G06Q 10/06* (2013.01); *G06Q 10/10* (2013.01)

(58) Field of Classification Search
  CPC ..... G06F 17/3097; G06F 17/30; G06Q 10/10; G06Q 10/06
  See application file for complete search history.

(56) References Cited

U.S. PATENT DOCUMENTS

| 8,554,647 B1 * | 10/2013 | Grigg ............ G06Q 40/02 701/469 |
| 8,645,825 B1 | 2/2014 | Cornea et al. |
| 2006/0218088 A1 * | 9/2006 | Flora ............ G06Q 10/10 705/39 |
| 2009/0119289 A1 | 5/2009 | Gibbs et al. |

(Continued)

FOREIGN PATENT DOCUMENTS

| KR | 1020110037565 A | 4/2011 |
| WO | 2012052983 A1 | 4/2012 |

OTHER PUBLICATIONS

Extended European Search Report dated Jul. 1, 2016 for Application No. 14875889.9.

*Primary Examiner* — Kristopher Andersen (74) *Attorney, Agent, or Firm* — Patterson + Sheridan, LLP (57) ABSTRACT

During this autocomplete technique, autocomplete results for data-entry information from a user are ranked based on financial-transaction histories of a group of entities and the user, where the group of entities and the user belong to a common business cohort. In particular, the business cohort may include entities that: are located proximate to the user, have a similar size as a business associated with the user (such as a similar number of employees and/or similar revenue), and/or occur frequently in a financial-transaction history of the user (and don't occur frequently in the financial-transaction histories of the group of entities). The ranking may be used to increase the accuracy or relevance of the autocomplete results to the user. For example, the ranking may give preference in the autocomplete results to entities in the group of entities (relative to other entities, such as those in different business cohorts).

20 Claims, 5 Drawing Sheets

(56) References Cited

U.S. PATENT DOCUMENTS

2013/0041878 A1    2/2013  Satyanarayana et al.
2013/0080460 A1*  3/2013  Tomko .............. G06F 17/30864
                                                                  707/767
2014/0089136 A1*  3/2014  Mukherjee ............. G06Q 40/02
                                                                    705/26.7

* cited by examiner

RANKING AUTOCOMPLETE RESULTS BASED ON A BUSINESS COHORT

BACKGROUND

The present disclosure generally relates to computer-based techniques for ranking autocomplete results. More specifically, the present disclosure relates to a computer-based technique for ranking autocomplete results based on financial-transaction histories of an associated business cohort.

Autocomplete (which is sometimes referred to as word completion) is a widely used technique for predicting a word or phrase that a user wants to type in without requiring that the user completely type the word. In existing autocomplete techniques, the word is predicted based on how similar a typed fragment is to words in a corpus of predefined words (such as a dictionary).

However, the likelihood that a predicted word matches the word the user is typing can vary significantly. For example, certain characters occur more frequently than others in the corpus of predefined words and, in particular, at the beginnings of the words. In addition, the contextual meaning of different words in a phrase can vary considerably depending on the topic. These problems can make it more difficult to correctly predict the word the user is typing and may necessitate the use of longer n-grams to make the prediction, which can degrade the user experience.

SUMMARY

The disclosed embodiments relate to a computer system that ranks autocomplete results. During operation, the computer system receives data-entry information from a user, where the data-entry information is associated with an entity. Then, the computer system determines autocomplete results based on the data-entry information. Next, the computer system calculates the ranking of the autocomplete results based on financial-transaction histories of a group of entities and the user, where the group of entities and the user belong to a common business cohort.

Additionally, after calculating the ranking, the computer system may present a subset of the autocomplete results based on the calculated ranking.

Note that the entity may be a counterparty in a financial transaction with the user. For example, the entity may include a customer of the user or a vendor for the user.

Moreover, the user may be associated with a business.

Furthermore, the business cohort may be determined based on locations of the user and the group of entities. Alternatively or additionally, the business cohort may be determined based on numbers of employees and/or revenues of the user and the group of entities. For example, the number of employees and/or the revenue may indicate a size of a given entity. In some embodiments, the business cohort is determined based on business categories of the user and the group of entities. The business category of the user may be determined based on a number of occurrences of the business category in a financial-transaction history of the user and a frequency of occurrence of the business category in the financial-transaction histories of the group of entities.

In some embodiments, prior to calculating the ranking, the computer system determines the business cohort based on: numbers of employees, revenue, location, and/or a number of occurrences of a business category of the user in a financial-transaction history of the user and a frequency of occurrence of the business category in the financial-transaction histories of the group of entities.

Note that the calculated ranking may give preference to entities in the group of entities (relative to other entities, such as those in different business cohorts).

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for ranking autocomplete results, and a computer-program product (e.g., software) for use with the computer system are described. During this autocomplete technique, autocomplete results for data-entry information from a user are ranked based on financial-transaction histories of a group of entities and the user, where the group of entities and the user belong to a common business cohort. In particular, the business cohort may include entities that: are located proximate to the user, have a similar size as a business associated with the user (such as a similar number of employees and/or similar revenue), and/or occur frequently in a financial-transaction history of the user (and don't occur frequently in the financial-transaction histories of the group of entities). The ranking may be used to increase the accuracy or relevance of the autocomplete results to the user. For example, if the data-entry information is associated with an entity (such as a counterparty in a financial transaction), the ranking may give preference in the autocomplete results to entities in the group of entities (relative to other entities, such as those in different business cohorts).

By increasing the relevance of the autocomplete results, the autocomplete technique may make it easier for the user to provide data-entry information and to find a particular entity. This may improve the user experience when using software that uses the autocomplete technique, which may improve customer loyalty and sales of the software.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc. Additionally, a financial transaction may involve a product or a service (such as medical care) that is paid for using a type of currency, an asset and/or by barter. The financial transaction may be conducted by an individual and/or a business.

Figure 1:
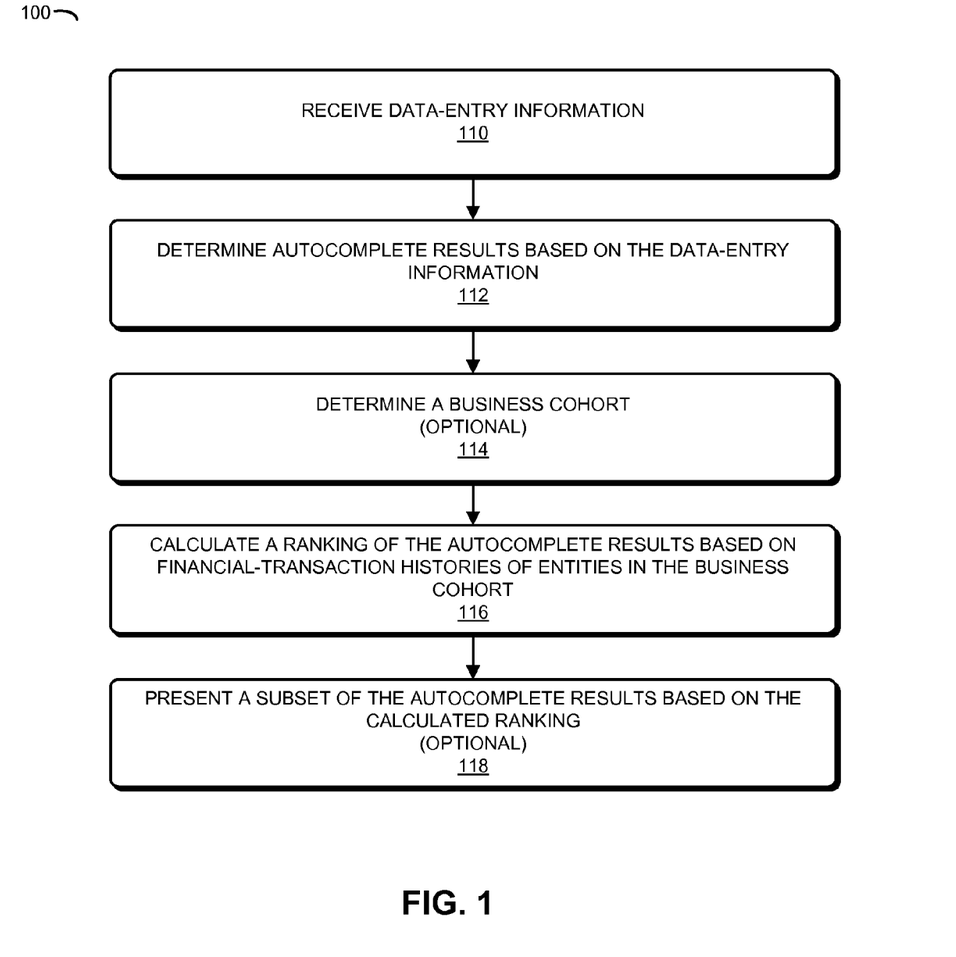
FIG. 1 is a flow chart illustrating a method for ranking autocomplete results in accordance with an embodiment of the present disclosure.

We now describe embodiments of the autocomplete technique. FIG. 1 presents a flow chart illustrating a method 100 for ranking autocomplete results, which may be performed by a computer system (such as computer system 500 in FIG. 5). During operation, the computer system receives data-entry information from a user (operation 110), where the data-entry information is associated with an entity. For example, the user may type or provide using a user interface (such as a keyboard or a voice-recognition system) characters in one or more words. Note that the user may be associated with a business and/or the entity may be a counterparty in a financial transaction with the user. For example, the entity may be another individual or another business, such as a customer of the user or a vendor for the user.

Then, the computer system determines autocomplete results based on the data-entry information (operation 112). For example, the computer system may compare the data-entry information to a corpus of business names. The resulting match scores (which reflect the similarity of the data-entry information and the business names) may be used to select a subset of the business names as potential autocomplete results.

Next, the computer system calculates the ranking of the autocomplete results based on financial-transaction histories of a group of entities and the user (operation 116), where the group of entities and the user belong to a common business cohort. In particular, as described further below, the business cohort may specify entities that are similar to the user. As a consequence, the businesses in the financial-transaction histories (i.e., previous financial transactions) of the group of entities may be more relevant to the user and, as such, may be used to reorder the autocomplete results so that they are more likely to be relevant to the user (i.e., they are more likely to accurately predict the business the user is trying to specify or provide using the data-entry information).

Note that the business cohort may be determined based on locations of the user and the group of entities. Thus, the entities in the business cohort may be proximate to each other (e.g., in the same town, city, region or state). Alternatively or additionally, the business cohort may be determined based on numbers of employees and/or revenues of the user and the group of entities. For example, the number of employees and/or the revenue may indicate a size of a given entity, so that the entities in the business cohort may have a similar size.

In some embodiments, the business cohort is determined based on business categories of the user and the group of entities. The business category of the user may be determined based on a number of occurrences of the business category in a financial-transaction history of the user and a frequency of occurrence of the business category in the financial-transaction histories of the group of entities. As described further below, this may ensure that common business categories across the financial-transaction histories of the group of entities are less likely to be used, while business categories that occur often in the financial-transaction history of the user are more likely to be used (i.e., the business category may be more likely to be unique and, thus, predictive of the user's interests or intent).

In some embodiments, prior to calculating the ranking (operation 116), the computer system optionally determines the business cohort (operation 114) based on: numbers of employees, revenue, location, and/or a number of occurrences of a business category of the user in a financial-transaction history of the user and a frequency of occurrence of the business category in the financial-transaction histories of the group of entities. Thus, the computer system may aggregate the user and the group of entities into the business cohort.

Additionally, after calculating the ranking (operation 116), the computer system may optionally present a subset of the autocomplete results based on the calculated ranking (operation 118). For example, the computer system may display the subset with the order of the autocomplete results modified based on the calculated ranking. Note that the calculated ranking may give preference to entities in the group of entities (relative to other entities, such as those in different business cohorts). In this way, the autocomplete technique may more accurately predict the words or phrases (such as business names) being provided by the user.

Figure 2:
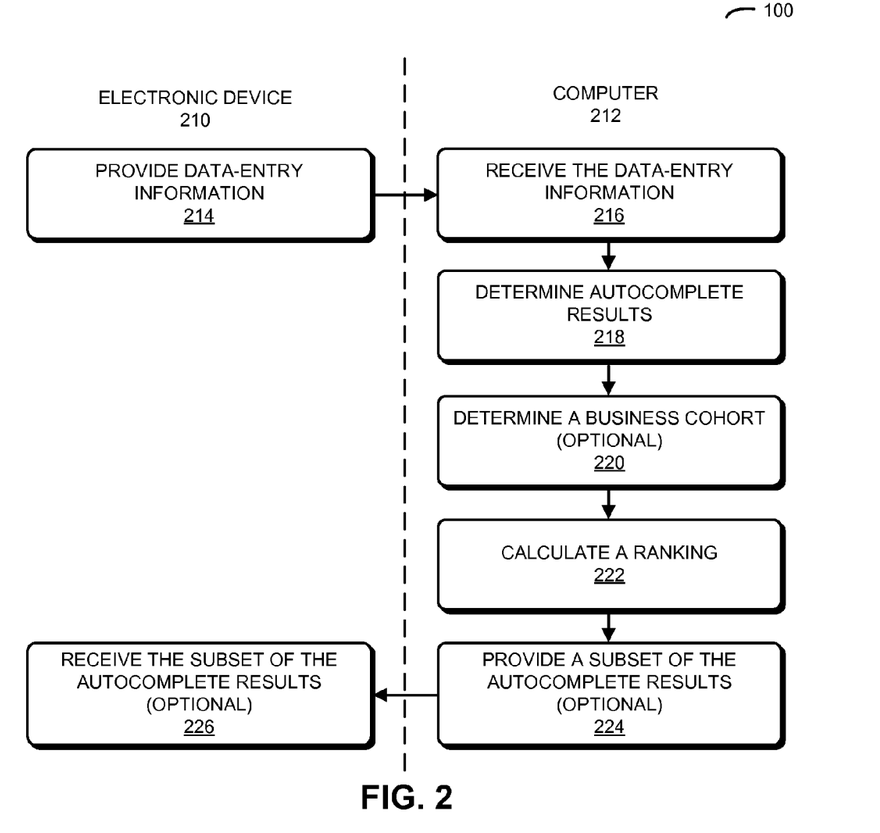
FIG. 2 is a flow chart illustrating the method of FIG. 1 in accordance with an embodiment of the present disclosure.

In an exemplary embodiment, the autocomplete technique is implemented using one or more electronic devices (such as a computer or a portable electronic device, e.g., a cellular telephone) and one or more computers (such as a server or a computer system), which communicate through a network, such as a cellular-telephone network and/or the Internet. This is illustrated in FIG. 2, which presents a flow chart illustrating method 100 (FIG. 1).

During the method, a user of electronic device 210 (such as an individual) may provide (operation 214) and computer 212 may receive (operation 216) the data-entry information. In response, computer 212 may determine the autocomplete results (operation 218).

Then, computer 212 may calculate the ranking (operation 222) based on the business cohort of the user and the group of entities. In particular, the financial-transaction histories of the entities in the business cohort may be used to calculate the ranking. As noted previously, computer 212 may first optionally determine the business cohort (operation 220).

Next, computer 212 may optionally provide (operation 224) and electronic device 210 may optionally receive (operation 226) at least the subset of the autocomplete results. This subset may be reordered based on the calculated ranking in order to improve the accuracy or relevance of the predictions for the user.

While FIG. 2 illustrates an embodiment in which electronic device 210 is associated with or belonging to a user and separate computer 212 determines the autocomplete results (which are then delivered to the user's electronic device 210). However, in some embodiments electronic device 210 receives cohort information and/or data from computer 212, and then electronic device 210 determines or generates the autocomplete results based on the cohort information and/or the data. Alternatively, in some embodiments electronic device 210 develops the cohorts and determines the autocomplete results based on data that is resident on electronic device 210 (i.e., computer 212 may not be needed).

In some embodiments of method 100 (FIGS. 1 and 2), there are additional or fewer operations. For example, after optionally presenting the subset in operation 118 in FIG. 1, the computer system may optionally receive user feedback about the presented subset (such as a user selection from the subset). This feedback may be used in the future when calculating a ranking based on future data-entry information from the user or other users in the business cohort (or other business cohorts). Moreover, the order of the operations may be changed, and/or two or more operations may be combined into a single operation.

In an exemplary embodiment, the autocomplete technique clusters businesses into business cohorts based on their financial-transaction patterns. The behavior of the cohorts is then used to increase the relevance of autocomplete results. Thus, the autocomplete technique may be used to personalize the autocomplete results based on the business cohorts of users. In the process, the autocomplete technique may: enhance the user experience, reduce the amount of data users need to enter or provide, and provide clear and more complete data. This autocomplete technique may be used separately from or in conjunction with existing autocomplete techniques.

As an illustration, when using accounting software to create an invoice, a user, Jane, may provide the data-entry information to the computer system to specify a business. For example, the data-entry information may include the characters 'Joe.' In response, the computer system may try to determine the business name Jane is providing using 'Joe.' By comparing 'Joe' to a corpus of business names (e.g., using string and location comparison scores), the computer system may identify four potential autocomplete results: Joe's crab shack, Joseph flowers, Josephine local flowers, and Joe's automotive store.

Using the autocomplete technique, the computer system may analyze Jane's existing financial transactions to identify behavioral patterns. Then, these behavioral patterns may be matched against the financial transactions and behavioral patterns of other users of the accounting software and segmented into different business cohorts.

For example, Jane's business may fall into the business cohort of small businesses that primarily source data from local vendors. The members of this business cohort may, in general, do business with 'Josephine local flowers' or businesses like 'Josephine local flowers.' Based on this and previously determined potential autocomplete results, the computer system may rank 'Josephine local flowers' above the other three potential autocomplete results and suggest it to the user. Furthermore, based on the user's subsequent selection, the computer system may update the business-cohort behavior, thereby benefiting Jane and all the users in this business cohort.

When calculating the ranking or determining the business cohort, the computer system may compute commercial-intent scores. In particular, the commercial-intent score of a user u in a business cohort to a business b may be calculated as:

$$\text{Category}(u, b) + \text{Size}(u, b) + \text{Distance}(u, b),$$

where $$\text{Category}(u, b) = TF(\text{Category}(b) \text{ in Cohort Category}(u)) \cdot IDF(\text{Category}(b)),$$

$$TF(\ldots) = \left(\text{Term Frequency}(\text{Category}(b) \text{ in Cohort Category}(u))\right)^{1/2}, \text{ and}$$

$$IDF(\text{Category}(b)) = 1 + \log\left(\frac{N}{N(\text{Category}(b)) + 1}\right).$$

Note that Term Frequency(Category(b) in Cohort Category (u)) equals the number of times a business category of business b occurs in the business categories of the business cohort of user u, Cohort Category(b) includes the business categories from the financial-transaction history of user u, Category(b) is the business category of business b, N is the total number of users in the business cohort of user u, and N(Category(b)) is the number of users in the business cohort who have used Category(b) at least once. In this calculation, the value of the business category is proportional to the number of times the business category of business b appears in the financial-transaction history of user u, but is offset by the frequency of the business category across the users in the business cohort. This approach helps to control for the fact that some business categories are too generic or are more common than others.

Furthermore, $$\text{Size}(\ldots) = NormalizedAcrossUsersSize(u, b) \cdot NormalizedAcrossBusinessesSize(u, b),$$

$$NormalizedAcrossUsersSize(u, b) = \log\left(1 + \frac{S(b)}{S_{avg\_cohort}(u) + 1}\right), \text{ and}$$

$$NormalizedAcrossBusinessesSize(u, b) = \frac{S(b)}{S_{avg}}.$$

Note that $S_{avg\_cohort}$ is the average size or number of employees of businesses with which the business cohort of user u conducts financial transactions, S(b) is the size or number of employees of business b, and $S_{avg}$ is the average size or number of employees at all known businesses. In this calculation, the normalized business size normalizes across all businesses as well as the business cohort of the user based on their financial-transaction history.

Additionally, $$\text{Distance}(u, b) = NormalizedAcrossUsersDistance(u, b) \cdot NormalizedAcrossBusinessesDistance(u, b)$$

$$NormalizedAcrossUsersDistance(u, b) = \log\left(1 + \frac{D(u, b)}{D_{avg}(b)}\right), \text{ and}$$

$$NormalizedAcrossBusinessesDistance(u, b) = \frac{D(u, b)}{D_{avg\_cohort}(u)}.$$

Note that D(u, b) is the distance between user u and business b, $D_{avg}(b)$ is the average distance between business b and the users that conducted financial transactions with business b, and $D_{avg\_cohort}(u)$ is the average distance between the business cohort of user u and the businesses with which the business cohort of user u conducted financial transactions. In this calculation, the normalized distance normalizes across the users for the business, as well as for the business cohort of the user across the businesses.

Figure 3:
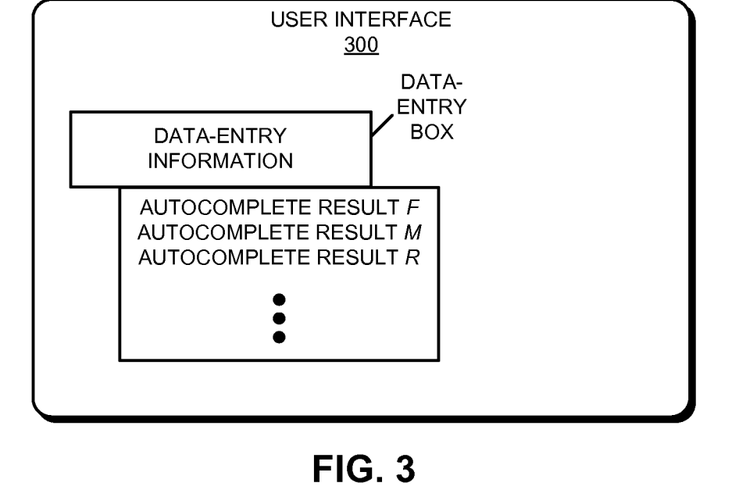
FIG. 3 is a drawing of a user interface that presents autocomplete results in accordance with an embodiment of the present disclosure.

Thus, the calculation may allow the autocomplete results to be personalized based on the behavior of the business cohort of the user. By tapping into the rich financial-transaction behaviors captured within the identified business cohorts of the user, the computer system can provide a more accurate set of autocomplete results. Moreover, the computer system may learn or improve with each user input, thereby benefiting the user and other users in the business cohort of the user. Consequently, the autocomplete technique may provide improved autocomplete-result accuracy across the users in a business cohort. This is shown in FIG. 3, which illustrates the use of the autocomplete technique in a user interface 300 to reorder autocomplete results. Thus, autocomplete results F, M and R are presented to the user (instead of a full-set of autocomplete results A-W).

In an exemplary embodiment, the user may have a business relationship with a coffee shop. For example, the user may regularly purchase from or supply coffee to particular family-owned coffee shops that are located within a 20-mile radius. Consequently, the computer system may analyze the user's financial-transaction history and assign the user to a business cohort of small, local businesses. When the user subsequently provides data-entry information, presented autocomplete results may be reordered so that related businesses in the user's business cohort (or in the financial-transaction histories of the businesses in the user's business cohort) are displayed more frequently or at the top of the autocomplete results.

Figure 4:
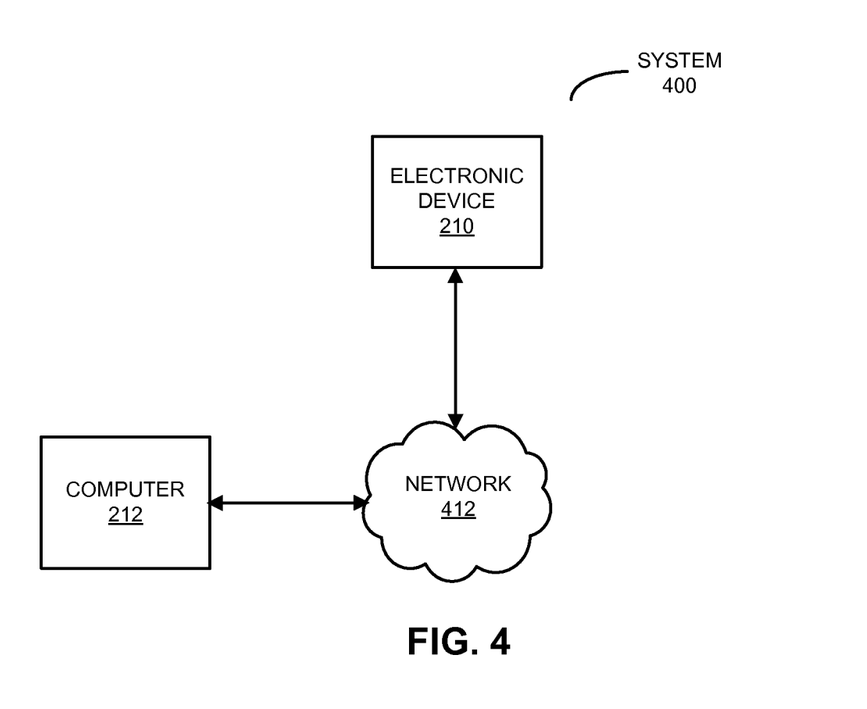
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the autocomplete technique electronic device 210 may use a software product, such as a software application that is resident on and that executes on electronic device 210. (Alternatively, the user may interact with a web page that is provided by computer 212 via network 412, and which is rendered by a web browser on electronic device 210. For example, at least a portion of the software application may be an application tool that is embedded in the web page, and which executes in a virtual environment of the web browser. Thus, the application tool may be provided to electronic device 210 via a client-server architecture.) This software application may be a standalone application or a portion of another application that is resident on and which executes on electronic device 210 (such as a software application that is provided by computer 212 or that is installed and which executes on electronic device 210). In an exemplary embodiment, the software product may be financial software, such as accounting software, income-tax software or payroll software.

During the autocomplete technique, the user of electronic device 210 may use the financial software. When using the financial software, the user may provide the data-entry information. For example, the user may type in the data-entry information. Alternatively, a voice-recognition technique may be used to analyze the user's spoken words to obtain the data-entry information.

Then, electronic device 210 may provide the data-entry information to computer 212 via network 412. In response, computer 212 may determine the autocomplete results, and may calculate the ranking based on the business cohort of the user and the group of entities. As noted previously, the financial-transaction histories of the entities in the business cohort may be used to calculate the ranking. In some embodiments, computer 212 optionally determines the business cohort before calculating the ranking.

Next, computer 212 may optionally provide at least the subset of the autocomplete results to electronic device 210 via network 412. This subset may be selected and/or reordered based on the calculated ranking. After receiving the subset, electronic device 210 may present it to the user. For example, the financial software may display autocomplete results to the user on a display of electronic device 210, such as in a user interface.

If the user selects one of the displayed autocomplete results, feedback may be provided to computer 212 via network 412. This feedback may be used to update weights of factors (such as those associated with business categories, business sizes or locations) or other aspects of the calculation used to determine future rankings of autocomplete results for the business cohort.

Note that information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
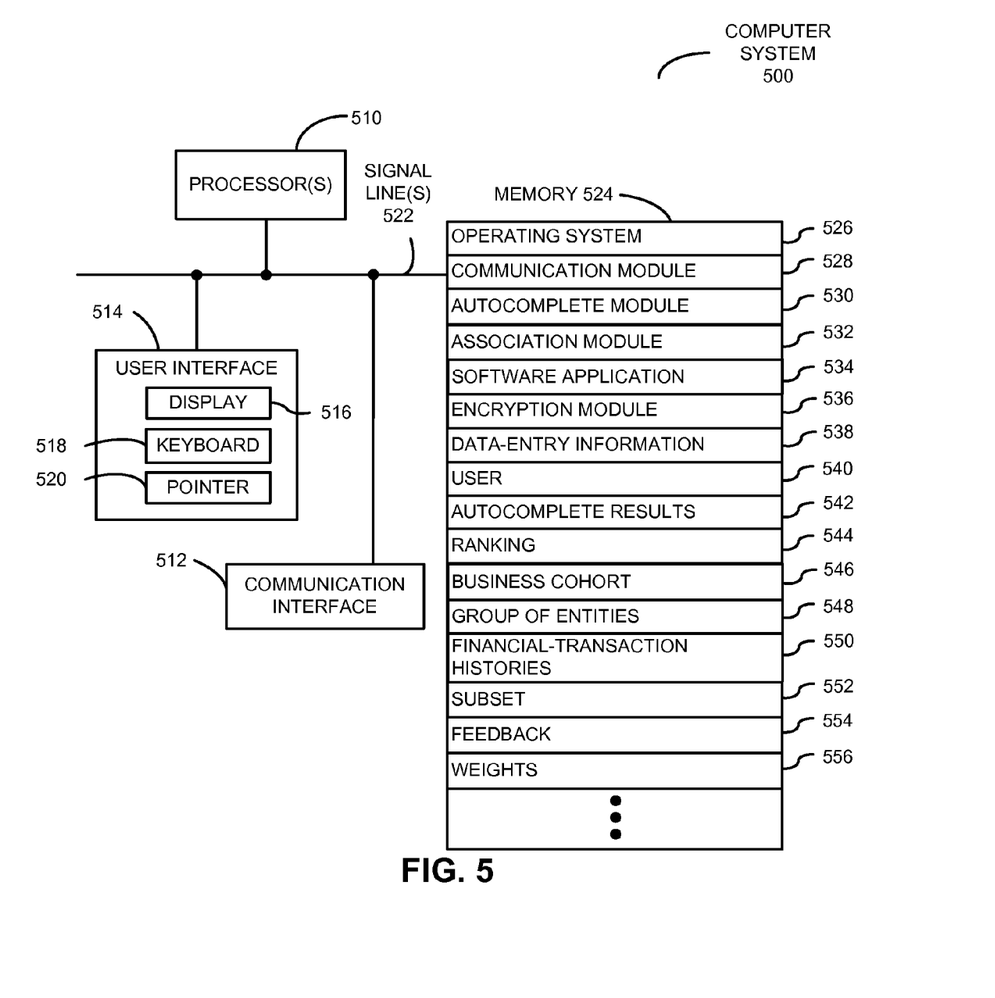
FIG. 5 is a block diagram illustrating a computer system that performs the method of FIGS. 1 and 2 in accordance with an embodiment of the present disclosure.

FIG. 5 presents a block diagram illustrating a computer system 500 that performs methods 100 (FIGS. 1 and 2). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: autocomplete module 530 (or a set of instructions), association module 532 (or a set of instructions), software application 534 (or a set of instructions), and/or encryption module 536 (or a set of instructions). Note that one or more of these program modules (or sets of instructions) may constitute a computer-program mechanism.

During the autocomplete technique, autocomplete module 530 may receive, via communication interface 512 and communication module 528, data-entry information 538. For example, user 540 may interact with a user interface in software application 534 to provide data-entry information 538.

In response to receiving data-entry information 538, autocomplete module 530 may determine autocomplete results 542, and may calculate ranking 544 based on a business cohort 546 of user 540 and group of entities 548. In particular, financial-transaction histories 550 of the entities in business cohort 546 may be used to calculate ranking 544. In some embodiments, association module 532 optionally determines business cohort 546 before calculating ranking 544.

Next, autocomplete module 530 may optionally provide at least subset 552 of autocomplete results 542 to user 540 (or the user's electronic device) via communication module 528 and communication interface 512. This subset may be presented to user 540. For example, the user interface in software application 534 may display subset 552 on a display of the user's electronic device.

If the user selects one of the displayed autocomplete results, feedback 554 may be provided to autocomplete module 530 via communication interface 512 and communication module 528. This feedback may be used to update weights 556 of factors (or contributions to a commercial intent) or other aspects of the calculation used to determine future rankings of autocomplete results for business cohort 546.

Because information used in the autocomplete technique may be sensitive in nature, in some embodiments at least some of the data stored in memory 524 and/or at least some of the data communicated using communication module 528 is encrypted or decrypted using encryption module 536.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), computer 212 (FIGS. 2 and 4), system 400 (FIG. 4), and/or computer system 500 may include fewer components or additional components. Moreover, two or more components may be combined into a single component, and/or a position of one or more components may be changed. In some embodiments, the functionality of electronic device 210 (FIGS. 2 and 4), computer 212 (FIGS. 2 and 4), system 400 (FIG. 4), and/or computer system 500 may be implemented more in hardware and less in software, or less in hardware and more in software, as is known in the art.

While the preceding embodiments illustrated the autocomplete technique using a business cohort and using the information in financial-transaction histories, in other embodiments the autocomplete technique is generalized to types of information other than business or financial transactions. For example, the user may be associated with a social cohort that includes a group of users based on social-interaction histories of the user and the group of users. These social-interaction histories may include communication (text messages, phone calls, emails, chat sessions, posts to web pages, posts to social networks, etc.) that indicate or specify individuals with common interests or common (or similar) friends.

Furthermore, while the autocomplete technique was illustrated in the context of certain types of software (such as income-tax preparation software), the autocomplete technique may be used with a wide variety of software applications, such as: web browsers, e-mail programs, search-engine interfaces, source-code editors, database-query tools, word processors, command-line interpreters and/or text editors. More generally, the autocomplete technique may be used in user interfaces to assist a user during entry of data or text (such as ASCII characters).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein

What is claimed is:

1. A computer-implemented method for selecting a subset of autocomplete results, the method comprising:
   receiving data-entry information from a user, wherein the data-entry information is associated with an entity;
   determining autocomplete results based on the data-entry information by comparing the data-entry information to a corpus of entities;
   determining entities to include in a common business cohort for the user by comparing data in a financial-transaction history of the user to data in financial-transaction histories of other users, wherein the entities to include in the common business cohort are determined based, at least in part, on location data associated with the entities and the user and a number of employees of the entities and the user;
   calculating an intent score For each result of the autocomplete results as a sum of a category score, a business size score, and a distance score, wherein:
      the category score is calculated as a function of a frequency in which the result appears in the financial-transaction histories of entities in the common business cohort and a number of times the result appears in the financial-transaction histories of the other users,
      the business size score is calculated as a function of a normalized business size for entities in the common business cohort and a normalized business size for the other users; and
      the distance score is calculated as a function of an average distance between entities in the common business cohort and counterparties to the entities in the common business cohort and an average distance between the user and counterparties to the user;
   ranking the results based on the intent score calculated for each result; and selecting a subset of the autocomplete results to present to the user, wherein the subset is based on the calculated ranking of the autocomplete results.

2. The method of claim 1, wherein the entity is a counterparty in a financial transaction with the user.

3. The method of claim 2, wherein the entity includes one of: a customer of the user; and a vendor for the user.

4. The method of claim 1, wherein the user is associated with a business.

5. The method of claim 1, wherein the data in the financial-transaction history of the user compared to data in the financial-transaction histories of other users to determine the entities to include in the common business cohort further comprises at least one of: a revenue, and a business category.

6. The method of claim 1, wherein determining the entities to include in the common business cohort includes comparing
  a number of occurrences of a business category in the financial-transaction history of the user and a frequency of occurrence of the business category in the financial-transaction histories of the other users.

7. The method of claim 1, wherein calculating the ranking of the autocomplete results further includes assigning a preference to results that include entities in the financial-transaction history of the user.

8. A computer-program product for use in conjunction with a computer system, the computer-program product comprising a non-transitory computer-readable storage medium and a computer-program mechanism embedded therein to select a subset of autocomplete results, the computer-program mechanism including:
  instructions for receiving data-entry information from a user, wherein the data-entry information is associated with an entity;
  instructions for determining autocomplete results based on the data-entry information by comparing the data-entry information to a corpus of entities
  instructions for determining entities to include in a common business cohort for the user by comparing data in a financial-transaction history of the user to data in financial-transaction histories of other users, wherein the entities to include in the common business cohort are determined based, at least in part, on location data associated with the entities and the user and a number of employees of the entities and the user;
  instructions for calculating an intent score for each result of the autocomplete results as a sum of a category score, a business size score, and a distance score, wherein:
    the category score is calculated as a function of a frequency in which the result appears in the financial-transaction histories of entities in the common business cohort and a number of times the result appears in the financial-transaction histories of the other users,
    the business size score is calculated as a function of a normalized business size for entities in the common business cohort and a normalized business size for the other users; and
    the distance score is calculated as a function of an average distance between entities in the common business cohort and counterparties to the entities in the common business cohort and an average distance between the user and counterparties to the user;
  instructions for ranking the results based on the intent score calculated for each result; and
  instructions for selecting a subset of the autocomplete results to present to the user, wherein the subset is based on the calculated ranking of the autocomplete results.

9. The computer-program product of claim 8, wherein the entity is a counterparty in a financial transaction with the user.

10. The computer-program product of claim 9, wherein the entity includes one of: a customer of the user; and a vendor for the user.

11. The computer-program product of claim 8, wherein the user is associated with a business.

12. The computer-program product of claim 8, wherein the data in the financial-transaction history of the user compared to data in the financial-transaction histories of other users to determine the entities to include in the common business cohort further comprises at least one of: a revenue, and a business category.

13. The computer-program product of claim 8, wherein determining the entities to include in the common business cohort includes comparing a number of occurrences of a business category in the financial-transaction history of the user and a frequency of occurrence of the business category in the financial-transaction histories of the other users.

14. The computer-program product of claim 8, wherein calculating the ranking of the autocomplete results further includes assigning a preference to results that include entities in the financial-transaction history of the user.

15. A computer system, comprising:
  a processor;
  memory; and
  a program module, wherein the program module is stored in the memory and configurable to be executed by the processor to select a subset of autocomplete results, the program module including:
  instructions for receiving data-entry information from a user, wherein the data-entry information is associated with an entity;
  instructions for determining autocomplete results based on the data-entry information by comparing the data-entry information to a corpus of entities;
  instructions for determining entities to include in a common business cohort for the user by comparing data in a financial-transaction history of the user to data in financial-transaction histories of other users, wherein the entities to include in the common business cohort are determined based, at least in part, on location data associated with the entities and the user and a number of employees of the entities and the user;
  instructions for calculating an intent score for each result of the autocomplete results as a sum of a category score, a business size score, and a distance score, wherein:
    the category score is calculated as a function of a frequency in which the result appears in the financial-transaction histories of entities in the common business cohort and a number of times the result appears in the financial-transaction histories of the other users,
    the business size score is calculated as a function of a normalized business size for entities in the common business cohort and a normalized business size for the other users; and
    the distance score is calculated as a function of an average distance between entities in the common business cohort and counterparties to the entities in the common business cohort and an average distance between the user and counterparties to the user;
instructions for ranking the results based on the intent score calculated for each result; and
instructions for selecting a subset of the autocomplete results to present to the user, wherein the subset is based on the calculated ranking of the autocomplete results.

16. The computer system of claim 15, wherein the entity is a counterparty in a financial transaction with the user.

17. The computer system of claim 16, wherein the entity includes one of: a customer of the user; and a vendor for the user.

18. The computer system of claim 15, wherein the data in the financial-transaction history of the user compared to data in the financial-transaction histories of other users to determine the entities to include in the common business cohort further comprises at least one of: a revenue, and a business category.

19. The computer system of claim 15, wherein determining the entities to include in the common business cohort includes comparing a number of occurrences of a business category in the financial-transaction history of the user and a frequency of occurrence of the business category in the financial-transaction histories of the other users.

20. The computer system of claim 15, wherein calculating the ranking of the autocomplete results further includes assigning a preference to results that include entities in the financial-transaction history of the user.

* * * * *